Patented May 5, 1942

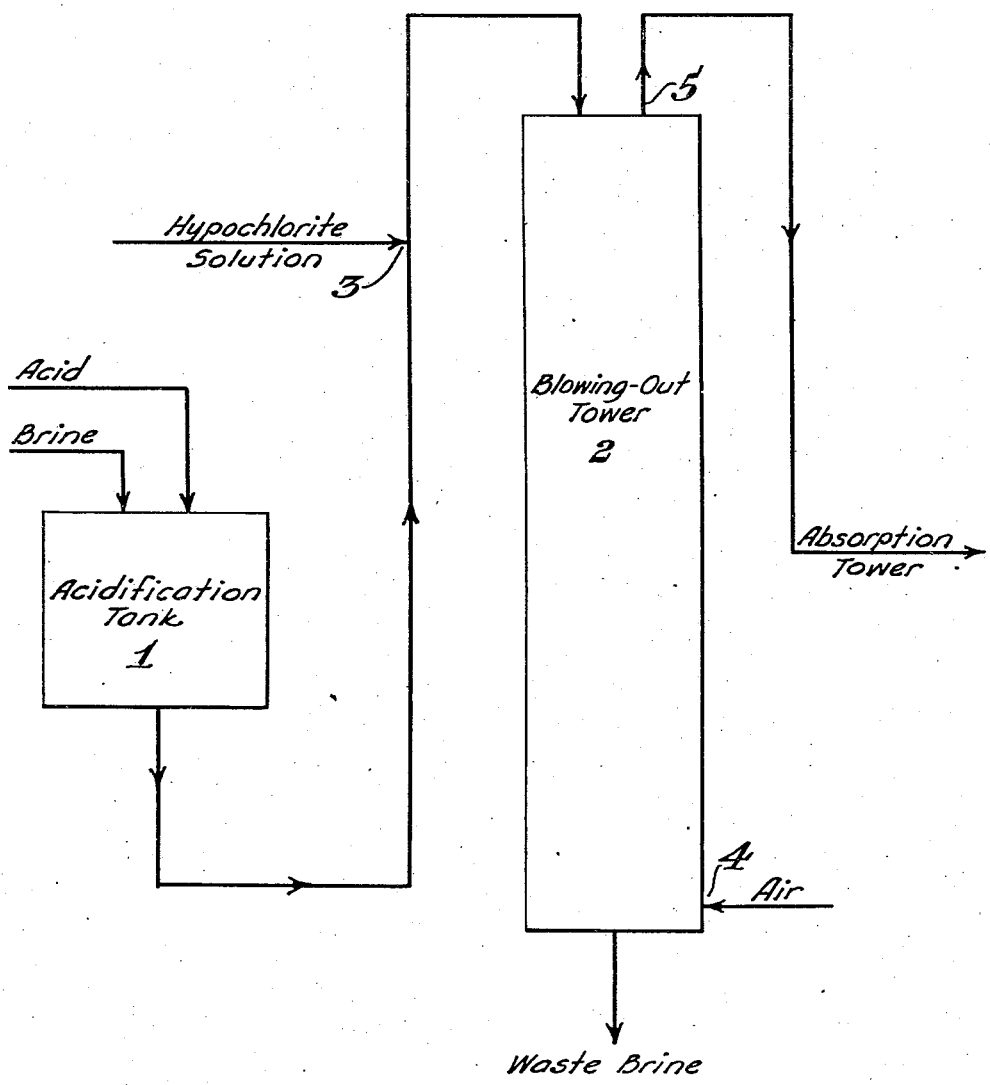

2,282,289

UNITED STATES PATENT OFFICE 2,282,289

HALOGEN EXTRACTION

Harold A. Robinson, Midland, Mich., assignor to The Dow Chemical Company, Midland, Mich., a corporation of Michigan Application January 29, 1940, Serial No. 316,189

5 Claims. (Cl. 23—216)

The invention relates to methods for extracting and recovering halogens from natural brines and the like. It more particularly concerns a method of extracting and recovering iodine from naturally occurring brines which contain but minute amounts of iodine.

A well-known method for extracting iodine from natural brines consists in acidifying the brine, oxidizing the acidified brine with chlorine gas to liberate iodine in the elemental state, vaporizing and blowing out the iodine by means of a current of air, and thereafter separating the iodine vapors from the air stream either by absorbing them in a suitable medium such as charcoal or a solvent, or by dissolving them in an agent which chemically combines with the iodine.

In the commercial operation of the process just described, it has been found desirable, if not necessary, to acidify the brine to the extent that the hydrogen ion concentration, as expressed by the term "pH," reaches a value of 2.5 or lower in order to avoid an excessive loss of product during the ensuing oxidizing and blowing-out steps. If the pH value of the brine is not of the low order just mentioned prior to the oxidizing step, a considerable portion of the iodine first formed is further oxidized to iodate by the strong oxidizing action of the chlorine usually employed as the oxidizing agent; and since the iodate is readily soluble in the acid liquor, it is not blown out and thus recovered, but instead is carried out and lost in the waste tail liquors from the blowing-out tower. Thus, the commercial operation of the process just described has the disadvantage that bringing the brine to the proper acidity necessarily involves the consumption of a large amount of acid and therefore a considerable expenditure, since enormous volumes of brine must be handled to secure a commercially significant amount of iodine.

It is therefore the principal object of the invention to provide a method of extracting iodine from salines which avoids the necessity of using large amounts of acid and at the same time insures an excellent yield of the desired product.

My invention resides in the discovery that by employing a hypochlorite as the oxidizing agent the acidity of the brine can be maintained at much higher pH value during the oxidizing step than was hitherto practicable, and at the same time side reactions, which the liberated iodine ordinarily enters into when oxidized with chlorine at the higher pH values, are suppressed to the extent that little or no loss of product occurs due to these reactions.

A preferred embodiment of the invention is represented by the single figure, somewhat on the order of a flow sheet, which shows diagrammatically the operation of the process in connection with the extraction of iodine from an iodine-containing brine. As shown, the iodiferous brine and acid, e. g. hydrochloric or sulfuric acid, are brought together in the acidification tank at 1 in the proper proportions. The acidified brine is pumped to the top of the blowing-out tower 2, while the hypochlorite solution is added at 3 in a manner to insure good mixing with the acidified brine and in amount sufficient to oxidize the combined iodine to free iodine. The acidified and oxidized brine is distributed over suitably arranged packing in the blowing-out tower 2 and flows downwardly therein against an ascending current of air introduced at the base of the tower and indicated at 4. The air current vaporizes or "blows out" the free iodine from the brine. The brine, substantially free of iodine, is conveyed away as waste at the bottom of the tower, while the air stream carrying the iodine is led away from the top of the blowing-out tower at 5 to a suitable absorption tower (not shown), where the iodine is removed and recovered in any of the various ways now old in the art.

As aforementioned, by employing my improved process, the acidity of the brine during the oxidizing step can be maintained at a much higher pH value than is possible if chlorine is employed as the oxidizing agent. For example, when employing chlorine as the oxidizing agent it is necessary in practical operation of the process to maintain the acidified brine at a pH value of from 2 to 2.5, while if a hypochlorite solution is employed, in accordance with the present invention, the oxidizing step is most suitably carried out at a pH value of from about 3 to 6, and preferably at between about 4 and 5. It is essential to employ an amount of acid such as will bring the pH value of the brine to below about 6, for otherwise a satisfactory yield or recovery of iodine will not be obtained. On the other hand, I have found that an increased recovery of iodine is not obtained by increasing the acidity of the brine to a pH value below about 4 when employing a hypochlorite solution as an oxidizing agent, although such increased acidity does no harm as regards a good recovery of iodine. Operation at a pH value of between 4–6 results in a great saving in the total amount of acid consumed in the process, with a resultant economy of operation. For example, when employing a brine from the Long Beach, California, field and operating at a pH of 4.5, the acid requirement is cut to approximately 50 per cent of that necessary when employing chlorine as the oxidizing agent and operating at a pH value of 2.5. Likewise, with other brines a similar saving of acid is realized, depending, of course, upon the degree of alkalinity of the brine being processed.

Although it is preferable to acidify the brine before carrying out the oxidizing step, the reverse procedure of first oxidizing the brine and thereafter acidifying to the proper pH value may be employed.

Among the hypochlorites that may be suitably used for carrying out the oxidation to liberate iodine are the hypochlorites of sodium, potassium, calcium, and magnesium, and hypochlorous acid. In addition, organic hypochlorites such as ethyl hypochlorite and tertiary butyl hypochlorite may be empoyled. In general, it is preferable to use aqueous solutions of calcium and sodium hypochlorites because of the ease with which they may be produced as desired for use. Either the calcium or sodium hypochlorite may be conveniently prepared as desired by passing chlorine gas through an aqueous solution of calcium or sodium hydroxide in the well-known manner. The cost attendant the manufacture of the hypochlorite used in the process is much less than the cost of the extra acid necessarily employed when oxidizing with chlorine at a pH of 2 to 2.5. The concentration of the hypochlorite solution employed may be varied over a relatively wide range. For example, concentrations of from $\frac{1}{20}$-normal to 2-normal have been found to be satisfactory. In general, the pH value of the hypochlorite solution should be maintained above about 5. For example, it has been found satisfactory to employ a hypochlorite solution having a pH value between about 5 and 11, and preferably between 8 and 10, since at the lower pH values more iodate tends to form with the attendant poorer recovery of iodine. It has been found desirable to employ an excess of hypochlorite solution over that necessary to meet the theoretical requirements for the liberation of the iodine present in the brine. An excess of from 50 to 100 per cent is a generally suitable amount.

In the foregoing manner iodine can be recovered from iodiferous brines without the necessity of employing the enormous quantities of acid necessarily employed in the conventional practice, wherein brine acidified to a pH of 2 to 2.5 is oxidized with chlorine.

Other modes of applying the principle of my invention may be employed instead of those explained, change being made as regards the process herein disclosed, provided the step or steps stated by any of the following claims or the equivalent of such stated step or steps be employed.

I therefore particularly point out and distinctly claim as my invention:

1. A process for producing iodine which comprises acidifying to a pH value between about 4 and 6 a saline solution containing the iodine in combined form, oxidizing to liberate the iodine by adding a hypochlorite solution having a pH value between about 5 and 11, and thereafter separating the liberated iodine from the so treated solution.

2. A process for producing iodine which comprises acidifying to a pH value between about 4 and 5 a saline solution containing the iodine in combined form, oxidizing to liberate the iodine by adding a hypochlorite solution having a pH value between about 8 and 10, blowing out the liberated iodine by means of a current of air, and thereafter recovering the free iodine from the air.

3. A process for producing iodine which comprises acidifying to a pH value between about 4 and 5 a saline solution containing the iodine in combined form, thoroughly mixing therewith an aqueous solution of an inorganic hypochlorite having a pH value between about 8 and 10, blowing out the liberated iodine by means of a current of air, and thereafter recovering the free iodine from the air.

4. A process for producing iodine which comprises acidifying to a pH value between about 4 and 5 a saline solution containing the iodine in combined form, oxidizing to liberate the iodine by adding an aqueous solution of sodium hypochlorite having a pH value between about 8 and 10, blowing out the liberated iodine by means of a current of air, and thereafter recovering the free iodine from the air.

5. A process for producing iodine which comprises acidifying to a pH value between about 4 and 5 a saline solution containing the iodine in combined form, oxidizing to liberate the iodine by adding an aqueous solution of calcium hypochlorite having a pH value between about 8 and 10, blowing out the liberated iodine by means of a current of air, and thereafter recovering the free iodine from the air.

HAROLD A. ROBINSON.